Dec. 31, 1940.   C. KASPAR   2,226,614
HACKSAW
Filed March 20, 1939
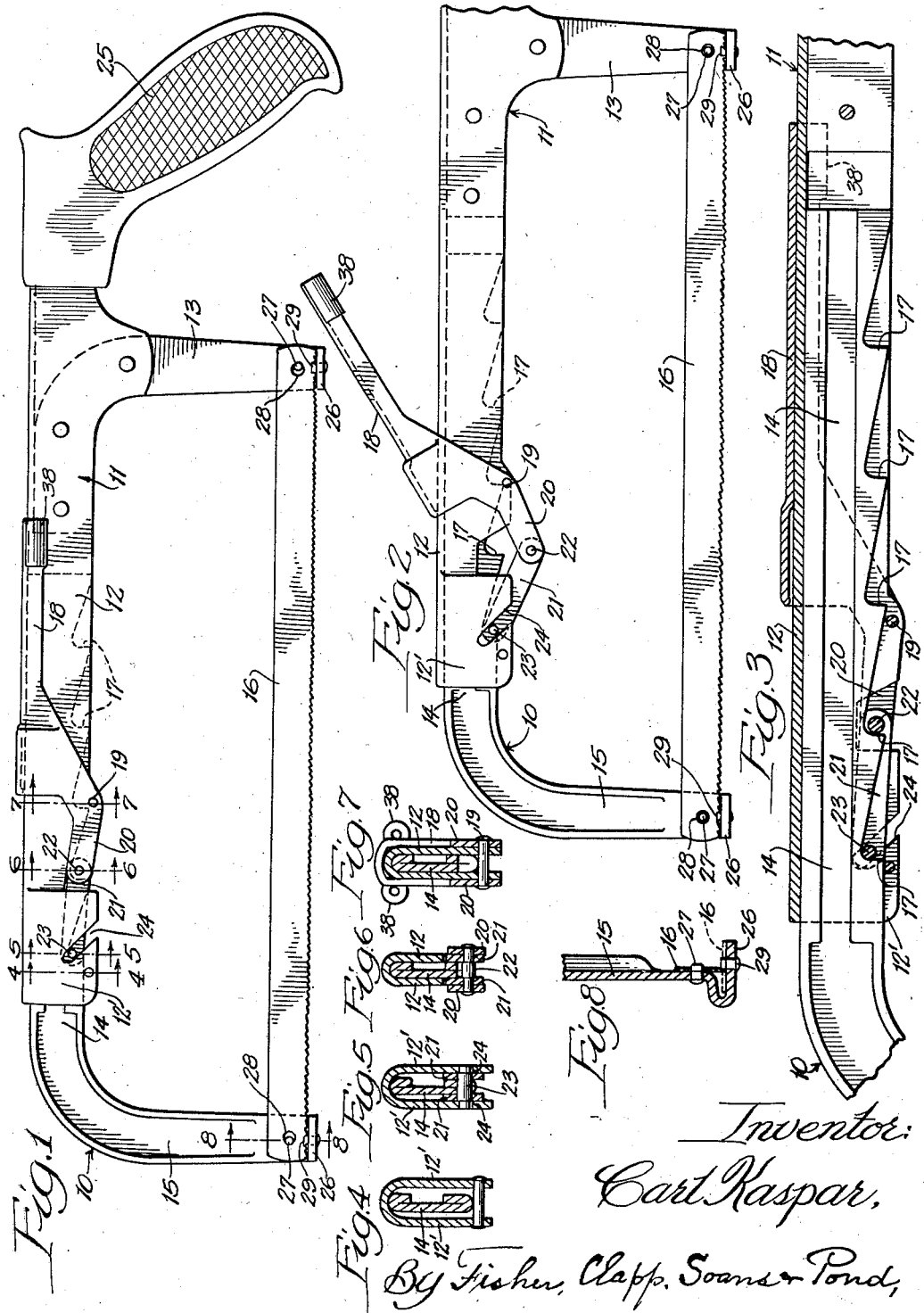
Inventor:
Carl Kaspar,
By Fisher, Clapp, Soans & Pond,
Attorneys.

Patented Dec. 31, 1940

2,226,614

UNITED STATES PATENT OFFICE 2,226,614

HACKSAW

Carl Kaspar, Chicago, Ill.

Application March 20, 1939, Serial No. 262,909

2 Claims. (Cl. 145—34)

This invention relates to hacksaws, and has reference more particularly to adjustable hacksaws of that type in which the frame of the saw is made in two longitudinally telescoping sections having means for locking them in adjusted position to accommodate blades of different lengths, and means for tensioning the blade. In one well known hacksaw of this type one end of the blade is connected to a threaded coupling rod slidably mounted in one end of the frame, and a wing nut on said rod bearing against the frame is tightened up to tension the blade. This puts a warp in the blade; and one object of my invention is to provide an improved blade tensioning device by which the blade can be tensioned without imparting any warp or twist to the blade.

A further object of the invention is to provide a quick acting device for both tensioning the blade and slackening the latter for removal that does not involve any screw action but operates on the principle of a handle-operated expander.

A further object is to provide a very simple sturdy and inexpensive hacksaw of the type referred to by which the frame and blade adjustments can be effected more easily and expeditiously than in hacksaws now known.

An illustrative embodiment of the invention is shown in the accompanying drawing, in which—

Fig. 1 is a side elevation, showing the blade tensioned as when ready for use.

Fig. 2 is a side elevation with the saw handle omitted, and showing the blade slackened as for removal and substitution of a new or re-sharpened blade.

Fig. 3 is an enlarged longitudinal vertical section through the backbone of the frame.

Figs. 4, 5, 6, 7 and 8 are vertical cross-sections on the corresponding lines of Fig. 1.

The frame of the saw comprises two relatively extensible frame members comprising a forward frame member designated as an entirety by 10 and a rear frame member designated as an entirety by 11. The rear frame member 11 consists of a hollow longitudinal limb 12 of inverted U-shape (as shown in Figs. 4 to 7 inclusive) and a transverse limb 13; and the forward frame member 10 comprises a longitudinal limb 14 preferably having its longitudinal edge portions folded over as shown in Figs. 4 to 7 inclusive and telescoping within the limb 12, and a transverse limb 15. On and between the free ends of the transverse limbs 13 and 15 is mounted, by means hereinafter described, the usual saw blade 16. On the lower edge of the limb 14 of the frame member 10 are formed a number of equally spaced ratchet teeth 17, best shown in Fig. 3.

Describing the means for tensioning the saw blade in the frame, 18 designates one arm of a handle lever of channel shape in cross section that straddles the outer telescoping limb 12 of the frame member 11 and is pivoted to the latter at 19. Continuous with the arm 18 and extending beyond the pivot 19 is the other arm 20, to the free end of which is pivoted at 22 a forwardly extending link 21. Both the arm 20 and the link 21 consist of twin laterally spaced limbs, as best shown in Figs. 5, 6 and 7, and the forward ends of the limbs of link 21 carry a cross pin 23 which, when the handle lever arm 18 is swung down from the position shown in Fig. 2 to that shown in Fig. 1, moves into thrust engagement with one of the ratchet teeth 17 and thereby pushes the frame member 10 forwardly to tension the blade 16. To guide the pin 23 into this thrust engagement with the ratchet tooth, the forward end of the telescopic limb 12 is formed with lateral offsets 12' of its side walls, in which are formed inclined slots 24 that are engaged by reduced end portions of the pin 23, as shown in Figs. 1 and 5.

The spacing of the ratchet teeth 17 is such that, when the handle lever arm 18 is fully lowered to expand the arm 20 and link 21, the pivot pin 22 can enter behind the next ratchet tooth in rear of the tooth that is engaged by the pin 23. Also, the mounting of the parts is such that when the handle lever arm 18 is fully lowered, the pivot pin 22 snaps slightly beyond dead center, as shown in Fig. 1.

The upswing of the handle lever arm 18 is limited by contact of the forward end of the cross member of the arm with the top surface of the limb 12 on which it is pivoted, so as to prevent drawing the pin 23 out of its guide slots 24.

One the rear end of the frame member 11 is mounted the usual saw handle 25.

Describing next the mounting for the ends of the saw blade 16 in the frame, the lower end portion of each transverse limb 13 and 15 of the frame sections is bent to provide a horizontal foot 26 that is disposed in a plane at right angles to the plane of the frame. Just above the foot 26 each limb 13 and 15 is equipped with a lateral pin or stud 27 that engages with a hole 28 in the end of the saw blade when the latter is mounted in the plane of the frame. In each foot 26 is a vertical pin or stud 29 that is similarly engageable with the holes 28 of the saw blade when it is desired to mount the latter in a plane at right angles to the plane of the frame, as indicated by dotted lines in Fig. 3. Both of the studs 27 and 29 are slightly undercut on their blade engaging ends, as indicated in Fig. 1, to lock the blade against accidental slipping off said studs when the saw is in operation. To facilitate raising and lowering the handle lever arm 18 by the thumb and finger, the free end of the arm is provided with lateral ears 38 that are readily formed by curling over lateral extensions of the metal of the handle arm.

To fit a blade to the frame, the handle arm 18 is swung upwardly as shown in Fig. 2, which permits the forward frame member 10 to be pushed inwardly sufficiently to engage the blade 16 with either of the pairs of studs 27 and 29. Thereupon the handle arm 18 is lowered to the position shown in Fig. 1, which, through the arm 20 and link 22, expands the frame and tensions the blade. When a new or re-sharpened blade is required, all the operator has to do is to swing the handle arm up, remove the old blade, insert a new or re-sharpened blade, and then lower the handle arm. The provision of a plurality of ratchet teeth 17 renders the saw frame readily expansible to serve saw blades of considerable varying lengths.

While I have herein shown and described one practical and preferred embodiment of the invention, I do not limit the latter to the exact structure shown and described, but reserve such variations and modifications in the details of structure and arrangement as fall within the spirit and coverage of the claims.

I claim:

1. In a hacksaw adapted to take blades of different lengths, the combination with a pair of frame members having longitudinal telescoping limbs one of which is formed with a row of ratchet teeth extending lengthwise of its lower edge, and transverse limbs rigid with the outer end portions of said longitudinal limbs, and a saw blade mounted on and between the free ends of said transverse limbs, of means for expanding said frame members to tension the blade comprising a handle lever pivoted intermediate its ends on the other telescoping limb, and a link pivoted at one end on the inner end of said handle lever and carrying on its other end a pin for thrust engagement with a ratchet tooth; the telescoping limb on which said handle is pivoted having an inclined slot engaged with said pin to guide the latter into engagement with said ratchet tooth.

2. In a hacksaw adapted to take blades of different lengths, the combination with a pair of frame members having longitudinal telescoping limbs the inner of which is formed with a row of ratchet teeth extending lengthwise of its lower edge, and transverse limbs rigid with the outer end portions of said longitudinal limbs, and a saw blade mounted on and between the free ends of said transverse limbs, of means for expanding said frame members to tension the blade, comprising a handle lever straddling the outer telescoping limb and pivoted intermediate its ends on the latter, and a link pivoted at one end on the inner end of said handle lever and carrying on its other end a pin for thrust engagement with a ratchet tooth; said outer telescoping limb having an inclined slot engaged with said pin to guide the latter into engagement with said ratchet tooth, and said handle lever having a stop cooperating with the limb on which it is pivoted to prevent withdrawal of said pin from said slot when the outer arm of said handle lever is swung in a direction to withdraw said pin from thrust engagement with said ratchet tooth.

CARL KASPAR.